(12) United States Patent
Takashima et al.

(10) Patent No.: US 6,685,175 B2
(45) Date of Patent: Feb. 3, 2004

(54) LIQUID-SEALED VIBRATION-PROOF DEVICE

(75) Inventors: Yukio Takashima, Osaka (JP); Hikofumi Yamamoto, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 10/071,538

(22) Filed: Feb. 8, 2002

(65) Prior Publication Data

US 2002/0130454 A1 Sep. 19, 2002

(30) Foreign Application Priority Data

Mar. 15, 2001 (WO) ................................ PCT/JP01/02063

(51) Int. Cl.[7] ................................................. F16F 13/00
(52) U.S. Cl. .................................. 267/140.13; 267/219
(58) Field of Search ............................ 267/140.13, 219, 267/141.1, 141, 153, 292–294, 220; 248/636, 562, 638; 180/300, 312, 902; 29/897.2, 521, 525.01

(56) References Cited

FOREIGN PATENT DOCUMENTS

| EP | 0332902 | 9/1989 |
|---|---|---|
| EP | 0635656 | 1/1995 |
| EP | 1241376 A2 * | 9/2002 |
| JP | 6-193674 | 7/1994 |
| JP | 10-132017 | 5/1998 |
| JP | 2000-230600 | 8/2000 |

OTHER PUBLICATIONS

Translation of JP 10–132017.*
Translation of JP 193674.*
Translation of JP 230600.*

* cited by examiner

Primary Examiner—Douglas C. Butler
(74) Attorney, Agent, or Firm—Jordan and Hamburg LLP

(57) ABSTRACT

The invention provides a liquid-sealed vibration-proof device, whose partition is constituted of and shaped separately by an orifice member having an orifice channel, a partition plate member forcing its outer periphery toward an outer peripheral end of a vibration-proof base on the liquid chamber side, and a second diaphragm closing a central opening of the orifice member. A recessed groove of a marginal portion of the second diaphragm is press-fitted in and engaged with a hook portion projecting inwardly of the orifice member, and a bottom wall of the recessed groove is pinched and pressed by the hook portion and the partition plate member, whereby the assembling is facilitated, ensuring a reliability and functionality of a product.

10 Claims, 4 Drawing Sheets

LIQUID-SEALED VIBRATION-PROOF DEVICE

BACKGROUND OF THE INVENTION

1. Field of the Invention

This invention relates to a liquid-sealed vibration-proof device mainly used for supporting and bearing a vibration generator such as an engine of an automotive vehicle or the like.

2. Description of Related Art

As a liquid-sealed vibration-proof device, e.g. an engine mount for bearing a vibration generator such as an automotive engine so as not to transmit its vibrations to a vehicle body side, such a device is known that is adapted and constructed so that a partition bisecting a liquid chamber inside the device proper into a main liquid chamber and a subsidiary liquid chamber, and an orifice, through which to bring the main liquid chamber and the subsidiary liquid chamber into communication with each other, is formed in the partition, whereby a vibration damping function is exhibited owing to the fluidization effect of liquid through the orifice between both liquid chambers. Another one appears, wherein the aforementioned partition is further provided with a second diaphragm for the purpose of damping vibrations of different frequencies.

The performance required for the liquid-sealed vibration-proof device as described above is that the orifice length and sectional orifice area of the partition and elasticity moduli of both diaphragms exhibit a desired vibration damping function, and besides, a reliability for maintaining the vibration damping function (sealing property) as well as an assembling property for incorporating the partition into the vibration-proof device proper are parameters of vital importance.

For instance, JP P2000-230600 A discloses a liquid-sealed vibration-proof device, which adopts the construction that a partition consisting of three members of an orifice member, a partition plate member and a second diaphragm is provided, and the partition plate member is fixed at its outer peripheral end by crimping to an attachment fitting of the vibration-proof device proper, on the one hand, while the orifice member is forced, at the outer margin of the upper end thereof, to the outer peripheral end of a vibration-proof base on the liquid chamber side thereby positioning, on the other hand. The functionality and reliability as required are thus ensured, and further an assembling property is enhanced.

According to the liquid-sealed vibration-proof device as described in the foregoing Publication, however, because of the construction that the second diaphragm of the three-member partition is vulcanization-bonded to the orifice member, an extra process step of bonding the second diaphragm to the orifice member is necessitated upon manufacturing and besides, upon employing, the second diaphragm is likely to cause a rubber breakdown at the marginal portion and an adhesive separation at the terminal portion owing to a liquid pressure difference of the liquid chamber ascribable to its adhesiveness performance, so that the device is not necessarily complete and satisfactory in the aspect of reliability.

SUMMARY OF THE INVENTION

In order to solve the above-mentioned problems, the present invention is intended to provide such a liquid-sealed vibration-proof device that the three members including the orifice member, partition plate member and second diaphragm constituting the partition are assembled in a non-adhesion condition thereby permitting to satisfy both the functionality and reliability and concurrently to ensure a good assembling property.

More specifically, such a construction of the partition is adopted that the orifice member, the second diaphragm and the partition plate member are formed respectively in separate bodies; and when the partition is assembled, a recessed groove formed in the marginal portion of the second diaphragm is engaged with a hook portion of the orifice member projecting inboard and the bottom wall of the recessed groove is clamped and held between the hook portion and the partition plate member.

According to this construction, because of the structure that the second diaphragm is engaged with the hook portion of the orifice member and besides, the second diaphragm is pinched and pressed between the orifice member and the partition plate member, it is possible to maintain the bonding force (sealing performance) of the three members even under high pressure. Here, since the bonding of the second diaphragm to the other members is conducted at a marginal position linked to the surrounding of the rubber-like elastomer membrane, the functionality of the rubber-like elastomer membrane can be ensured without affecting its elasticity modulus. In addition, because the partition plate member, orifice member and second diaphragm are formed separately and an adhesion step is dispensed with, a manufacture at low cost is feasible and a good assembling property is achieved.

In particular, where the construction that the recessed groove at the marginal portion of the second diaphragm is press-fitted into and engaged with the hook portion of the orifice member is adopted, it is possible to enhance remarkably its sealing performance in cooperation with the clamping construction of the bottom wall of the recessed groove.

Where a further construction is adopted such that the partition plate member is formed at its central opening wall with a support cylinder by axial bending and a whole inner periphery of the marginal portion of the second diaphragm is press-fitted into the support cylinder to be supported, the marginal portion of the second diaphragm is firmly bonded to the other members, whereby the functionality of the second diaphragm as a rubber-like elastomer membrane (lowering function in dynamic spring constant) can be more firmly ensured.

In this case, the construction of the partition plate member is exemplified by the one that a plate-like material is press formed into a support cylinder supporting an inner wall forming the recessed (trough-like) groove of the second diaphragm, a clamping portion clamping the bottom wall of the trough-like groove of the second diaphragm, a forcing portion pressing the orifice member upwardly, and a locking portion locked to an attachment fitting by crimping, linked together in this order from inboard to outboard.

As the construction of the marginal portion of the second diaphragm, such an example can be enumerated that the recessed groove of an upside-open U-shape in cross-section is formed of a longitudinal inside wall linked to the surroundings of the rubber-like elastomer membrane, a longitudinal outside wall formed in its perimeter, and a transverse bottom wall linking between both sidewalls, and into the recessed groove is press-fitted or inserted the hook portion of the orifice member.

The orifice member may be either shaped by subjecting a metal plate material to drawing working and forming an orifice channel at the outer periphery or integrally shaped by mold forming, but from the viewpoint of obtaining an orifice member with a sectional area and a shape as desired, a mold shaped product is preferred. In this case, either metal or synthetic resin may be adopted as a raw material for it. A mold formed product of aluminum for a metal and a molded product of engineering plastic for a synthetic resin can be exemplified.

DESCRIPTION OF PREFERRED EMBODIMENTS

Figure 1:
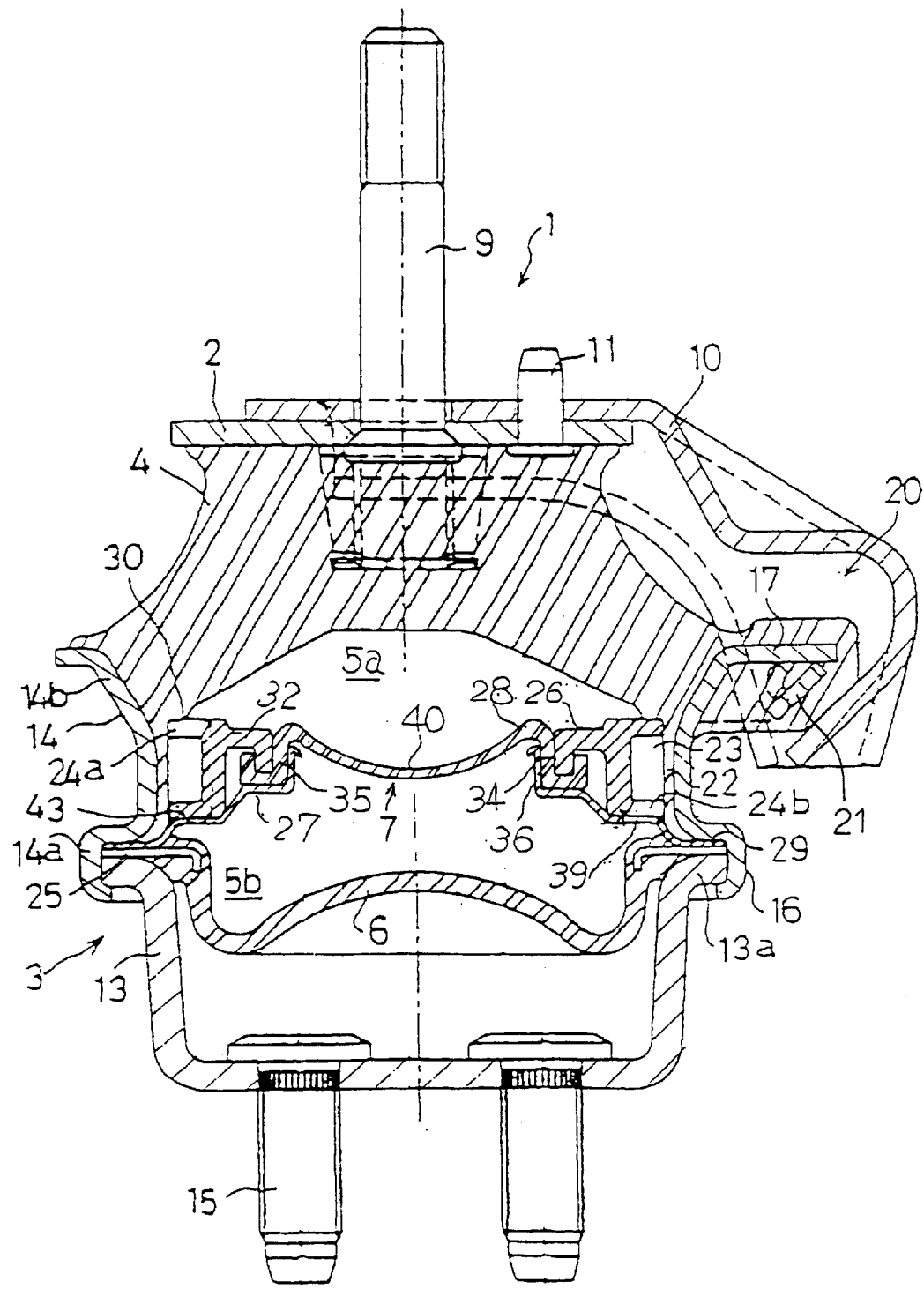
FIG. 1 is a sectional view of a liquid-sealed vibration-proof device showing an embodiment of this invention.

The most preferred embodiments for carrying the invention into effect will be described with reference to the accompanying drawings. In this embodiment of a liquid-sealed vibration-proof device 1, its device proper is constructed of an upper attachment fitting 2 to be attached to a vibration generator, e.g. engine, a lower attachment fitting 3 to be attached to a vehicle body side, a vibration-proof base 4 made of a rubber-like elastomer interconnecting both attachment fittings 2, 3, and a first diaphragm 6 disposed on the lower fitting 3 side so as to oppose the vibration-proof base 4 and constituting a liquid chamber 5 between itself and the vibration-proof base 4.

Internally of the device proper, there is provided a partition 7 partitioning the liquid chamber 5 into an upper primary liquid chamber 5a and a lower subsidiary liquid chamber 5b. The partition 7 is provided with an orifice channel 23 and a second diaphragm 28 so as to exhibit vibration-damping functions in different frequency regions.

The upper attachment fitting 2 is configured in a flat plate form and is fixed at its center with an attachment bolt 9 projecting upwardly to support the engine and the like. On the top of the upper attachment fitting 2, a stopper fitting 10 for absorbing a large displacement that overhangs laterally and assumes a generally C shape in cross-section is fixed at its base part with a vis (threaded nail) 11 by positioning.

The lower attachment fitting 3 is composed of a bottomed cylinder portion 13 having an outward flange 13a splaying at its upper end and a cylindrical barrel (drum) portion 14 fastened at its lower end to the outward flange 13a.

The bottomed cylinder portion 13 is fixed at its bottom with attachment bolts 15 to be fitted to the vehicle body side. The cylindrical barrel portion 14 has a lower end flange 14a diverging or flaring at its lower end so that the first diaphragm 6 and an outer peripheral locking portion 29 of a partition plate member 27 of the partition 7 may be pinched and held between the lower end flange 14a and the outward flange 13a of the bottomed cylinder portion 13. To the top of the lower end flange 14a, a fastening portion 16 is provided to extend, and the fastening portion 16 is inserted internally by the outward flange 13a of the bottomed cylinder portion 13 and fastened by crimping so as to surround the outward flange 13a from outside.

Further, the cylindrical barrel portion 14 extends and splays at its upper side 14b in a taper form, and at part of the top end of the splaying portion 14b there is formed a flange 17 opposing the end of the stopper fitting 10. And the vibration-proof base 4 is vulcanization-bonded to the inner face of the splaying portion 14b and the outer periphery of the flange 17 so as to surround them.

The vibration-proof base 4 serves to exhibit a vibration-insulating function, and is formed of a rubber-like elastomer in an umbrella form bonded by vulcanization to the upper attachment fitting 2 and the cylindrical barrel portion 14 of the lower attachment fitting 3. At the same time, the vibration-proof base 4 surrounds the flange 17 of the cylindrical barrel portion 14 in a manner extending up to a position opposing an inner face of the extremity of the stopper fitting 10, and the extension portion is made a stopper portion 20 for absorbing a large displacement.

The stopper portion 20 has a reinforcement fitting 21 embedded and interposed between the flange 17 and the stopper fitting 10. In addition, the rubber-like elastomer of the vibration-proof base 4 is extended up to the lower end of the inner wall of the cylindrical barrel portion 14 in a thin membrane form, and in the inner peripheral wall of the thin membrane portion 22 the partition 7 is press-fitted.

The first diaphragm 6 is of a flexible rubber-like elastomer membrane, at the outer periphery of which an annular support fitting 25 is embedded at its inner end and integrated. The support fitting 25 is seated on the outward flange 13a of the bottomed cylindrical portion 13. The space enclosed by the first diaphragm 6, and the underside of and the thin membrane portion 22 of the vibration-proof base 4 is made the liquid chamber 5, and the partition 7 is arranged to partition the liquid chamber 5 into upper and lower parts.

Figure 2:
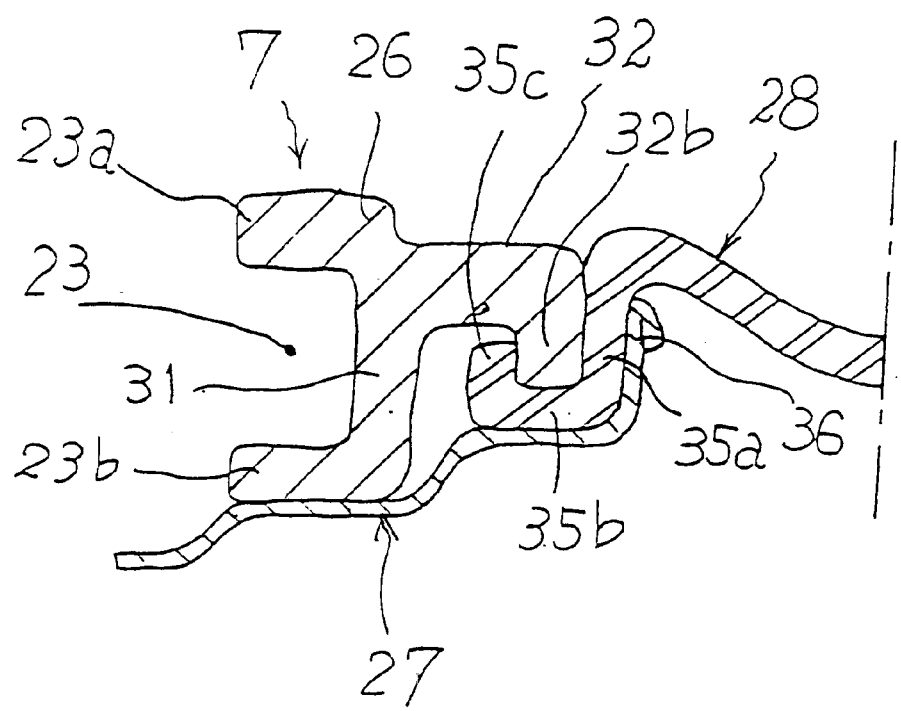
FIG. 2 is an enlarged sectional view of a partition in the aforementioned device showing essential parts thereof.
Figure 3:
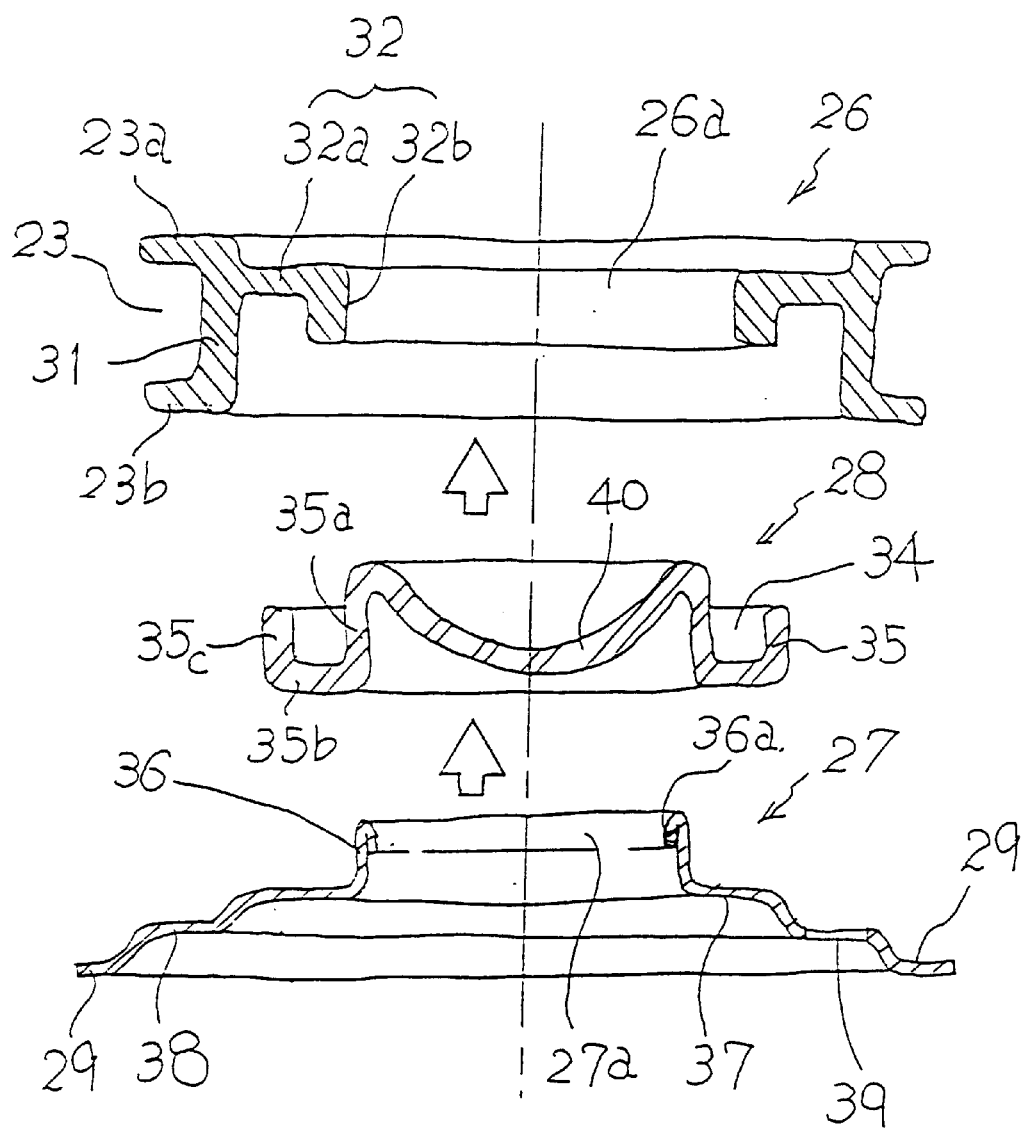
FIG. 3 is an exploded view of the partition.

The partition 7 consists of, as shown in FIGS. 1 to 3, an orifice member 26, the partition plate member 27 and the second diaphragm 28, thus three members. Only the outer peripheral locking portion 29 of the partition plate member 27 is crimped and fixed to the bottomed cylindrical portion 13 of the lower attachment fitting 3 and the fastening portion 16 of the cylindrical barrel portion 14 whereas the orifice member 26 is seated and forced, at its outer marginal portion on the upper end side, on a cutout step portion 30 of the vibration-proof base 4, which is formed at an outer peripheral terminal portion thereof on the liquid chamber side in an annular form to assume an L-shape in cross-section.

The orifice member 26 is an annular mold-shaped product having an opening 26a at its center and is formed circumferentially with an orifice channel 23 of a transverse U-shape in cross-section, which opens at its marginal lateral part, and the space surrounded by the orifice channel 23 and the inner peripheral wall of the thin membrane portion 22 of the vibration-proof base 4 is made an orifice 24.

At an upper end wall portion 23a of the orifice channel 23 there is formed an entrance-exit port 24a on the main liquid chamber side whereas at a lower end wall portion 23b thereof there is formed an entrance-exit port 24b on the subsidiary liquid chamber side being in communication with the subsidiary liquid chamber side. A partitioning longitudinal wall (not shown) is formed to shut the orifice channel 23 in order to avoid the shortcut of both ports 24a, 24b.

Inboard of a peripheral orifice wall 31 of the orifice channel 23 there is formed a hook portion 32 projecting. The hook portion 32 is formed of a concave wall 32a projecting inwardly of the peripheral orifice wall 31 and a vertical wall 32b bent downwardly from the inner end of the concave wall 32a as a reverse L-shape portion in cross-section. The vertical wall 32b is adapted so that the recessed groove 34 of the second diaphragm 28 may be press fitted into it.

A material constituting the orifice member 26 may be either aluminum or an engineering plastic. In particular, polyphthalamide (PPA) resin or polyphenylenesulfide (PPS) resin each containing 30 to 60% of glass fiber is preferred. These glass fiber containing resins have a high strength, rigidity and dimensional stability and besides, are especially excellent in resistance to ethylene glycol as a sealing liquid in the liquid-sealed vibration-proof device and in heat resistance to the sealing liquid at elevated temperature upon vibration damping.

The partition plate member 27 is shaped from a plate member by press forming, and consists of a support cylinder 36, a clamping portion 37 for pinching and pressing the bottom wall 35b of the recessed groove of the second diaphragm 28, a forcing portion 38 for forcing the lower wall 23b of the orifice member 26 upwardly, and an outer peripheral locking portion 29 fixed to the aforementioned attachment fitting by crimping, all of which are linked from inboard to outboard in this order.

The wall of the support cylinder 36 is formed by bending the plate member longitudinally (axially), and the clamping portion 37, the forcing portion 38 and the locking portion 29 are substantially plane. The forcing portion 38 is raised against the locking portion 29 by one step and the clamping portion 37 is raised against the forcing portion 38 by one step, and interlinking portions of these are formed as a slope face, whereby assuming as a whole a reverse cup shape having a central opening 27a.

The forcing portion 38 is formed at its position directly beneath the entrance-exit port 24b on the subsidiary liquid chamber side by a communication hole 39 communicating with the subsidiary liquid chamber 5b. The support cylinder 36 is turned up inwardly at its top to form a turn-up rib 36a.

The second diaphragm 28 is molded by rubber or elastomer as a separate body from the orifice member 26, and consists of a rubber-like elastomer membrane 40 of a hemispherical form being concave on its main liquid chamber side and a marginal portion 35 integrally molded to it at its periphery.

At the marginal portion 35 there is formed a recessed groove 34 engaging with the hook portion 32 of the orifice member 26. The recessed groove 34 is configured of an inner wall 35a linked to the surrounding of the rubber-like elastomer membrane 40, an outer wall 35c formed around it, and a bottom wall 35b interlinking both walls 35a, 35c into an open-top U shape in cross section. When integrated into the orifice member 26, the outer wall 35c serves to guide the vertical wall 32b of the hook portion 32 to be press fitted. The bottom wall 35b is formed to be thick-walled (e.g. 5–6 mm) so that it is pinched between the lower end of the vertical wall 32b of the hook portion 32 and the clamping portion 37 of the partition plate member 27 thereby exhibiting a sealing function. The upper end of the inner wall 35a and the outer periphery of the rubber-like elatomer membrane 40 are linked, and the support cylinder 36 is adapted to be press fitted inside the inner wall 35a.

In assembling the liquid-sealed vibration-proof device 1 thus constructed above, first, the orifice member 26 made of aluminum or the like delimited at the periphery by the orifice channel 23 of a predetermined dimension is shaped by mold forming whereas aside from it, the second diaphragm 28 is configured by vulcanization molding. In the atmosphere, the recessed groove 34 of the second diaphragm 28 is press fitted into the hook portion 32 inside the peripheral channel wall 31 of the orifice member 26 to be engaged. Here, the outer wall 35c of the recessed groove 34 acts as a fitting guide to the vertical wall 32b of the hook portion 32, so that the press fitting can be smoothly performed.

Thereafter, in the liquid, the cylindrical barrel portion 14 of the lower attachment fitting 3 connected to the upper attachment fitting 2 through the vibration-proof base 4 is set with its lower opening facing upwardly, and under an evacuated condition of interior air, the orifice member 26 together with the second diaphragm 28 are press fitted along the thin membrane portion 22 of the vibration-proof base 4 until its upper outer periphery reaches the cutout step portion 30 of the vibration-proof base 4. From above it, the partition plate member 27 is press fitted or inserted along the fastening portion 16 of the cylindrical barrel portion 14.

At that time, while force-fitting the support cylinder 36 of the partition plate member 27 so as to support the entire inside periphery of the inner wall 35a of the second diaphragm 28, the press fitting is conducted in a manner that the communication hole 39 of the partition plate member 27 and the entrance-exit port 24b are opposed to each other Then the annular support fitting 25 of the first diaphragm 6 is press-fitted or inserted into the fastening portion 16.

By conducting these works in liquid, the liquid is sealed in the space between the first diaphragm 6 and the vibration-proof base 4, and subsequently, the assembly so obtained is removed out in the atmosphere and the residual liquid is adjusted. Next, the flange 13a of the bottomed cylinder portion 13 is received in the lower end flange 14a of the cylindrical barrel portion 14, and the fastening portion 16 is fixed by crimping, thus finishing the assembling work.

By this assembling procedure, the mere crimping and fixing of the partition plate member 27 affords the condition that the partition plate member 27 is pinched and tightened against the cutout step portion 30 of the vibration-proof base 4, so that the orifice 24 having a predetermined length and a cross-sectional area is sealed with liquid and the assembling is facilitated. As a consequence, for instance, it is possible to make the orifice 24 function as a fine long orifice for a countermeasure against shake vibrations (e.g. 10 to 15 Hz) and to make the second diaphragm 28 function so as to damp idle vibrations (e.g. 30 to 40 Hz).

According to this embodiment, three members including the orifice member 26, the partition plate member 27 and the second diaphragm 28 are assembled in a non-adhesive condition, with the result that it is possible to enhance the assembling property. Moreover because the support cylinder 36 of the partition plate member 27 is press-fitted in a manner supporting the entire inside of the peripheral portion 35 of the second diaphragm 28 and the central opening 27a of the support cylinder 36 does not interfere with the hemispherical rubber elastomer membrane 40 of the second diaphragm 28, these can be firmly held without impairing the functionality of the rubber-like elastomer membrane 40 (reduction of idle vibrations).

Further because the recessed groove 34 of the marginal portion 35 of the second diaphragm 28 is press-fitted and held in the hook portion 32 of the orifice member 26 and the bottom wall 35b of the recessed groove 34 is pinched and clamped between the clamping portion 37 of the partition plate member 27 and the hook portion 32, it is possible to ensure the stability of sealing between the constituent components while retaining the rigidity of the rubber-like elastomer membrane 40 under high pressure.

Figure 4:
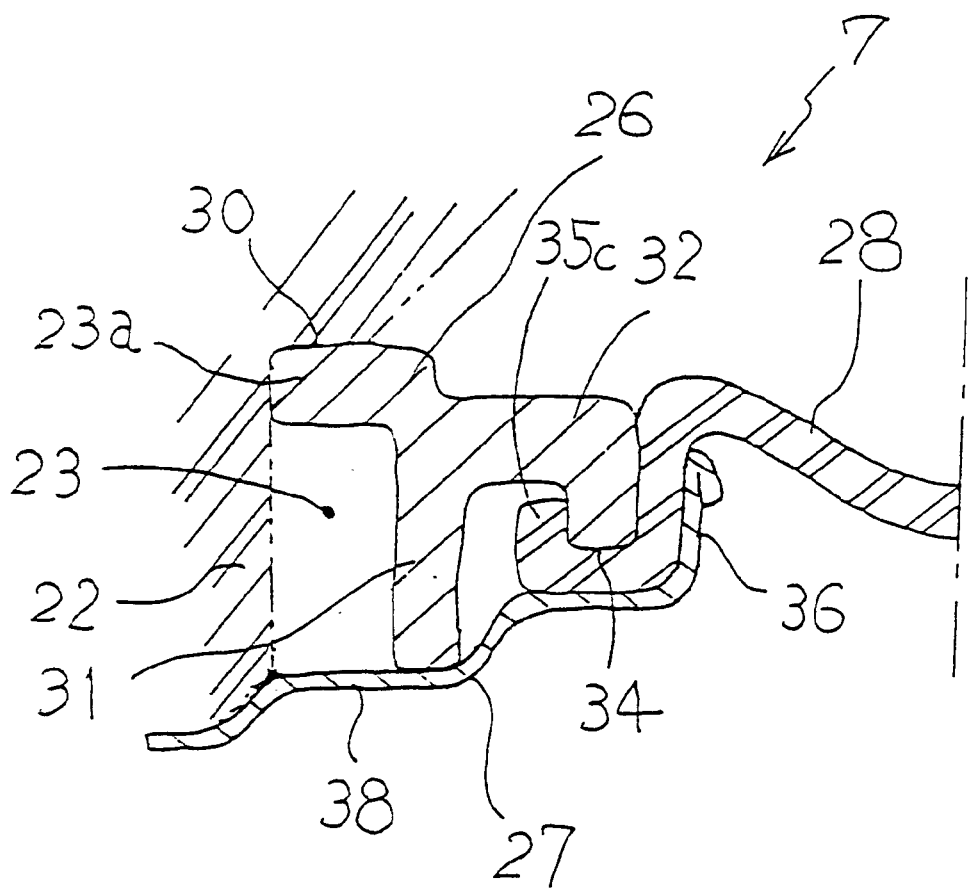
FIG. 4 is a sectional view of another embodiment of the partition showing essential parts thereof.

FIG. 4 is a sectional view of another embodiment of a partition showing its essential parts. In this embodiment, the lower wall 23b in the orifice member 26 shown in FIGS. 1 to 3 is dispensed with, and the orifice channel 23 is formed by a wall channel of an inverted L-shape in cross-section consisting of the upper wall 23a and the peripheral channel wall 31 and the forcing portion 38 of the partition plate member 27, the forcing portion 38 of the partition plate member 27 being made to function as a member for formation of the orifice channel, as well.

Also in this constitution, it is possible to compose the partition 7 by three members of the orifice member 26, the second diaphragm 28 and the partition plate member 27 and to assemble the three members 26, 27, 28 easily in a non-adhesion state, ensuring both functionality and reliability.

As is apparent from the description thus made, this invention makes it possible to provide a liquid-sealed vibration-proof device excellent in functionality, reliability and assembling property. Therefore if this is utilized as an engine mount supporting an automotive engine, it will be possible to provide an engine mount at a low cost and with an excellent assembling property owing to non-use of adhesive agent and with an excellent functionality and reliability because any breakdown of a terminal rubber portion due to a liquid pressure difference and separation of adhesion at a terminal portion can be avoided.

What is claimed is:

1. A liquid-sealed vibration-proof device including a vibration-proof comprising:

a vibration-proof base;

a first diaphragm, and a liquid chamber formed between the vibration-proof base and the first diaphragm; and a partition dividing the liquid chamber into a main liquid chamber and a subsidiary liquid chamber, wherein:

the partition is provided with an orifice member having an orifice channel at a peripheral side thereof and a central opening at a center portion of the orifice member, a partition plate member crimped and fixed beneath the orifice member such that an outer periphery of an upper end of the orifice member contacts an outer peripheral end of the vibration-proof base on an liquid chamber side of the vibration-proof base, and a second diaphragm closing the central opening of the orifice member;

the second diaphragm is formed as a separate body from the orifice member and has a recessed groove at marginal part, and the orifice member has a hook portion projecting inwardly so that the recessed groove is engaged with the hook portion;

the recessed groove has a bottom wall pinched and clamped between the hook portion and the partition plate member; and the partition plate member has, at central opening wall thereof, of a support cylinder bent axially, and a whole inner periphery of the marginal part of the second diaphragm is press-fitted in the support cylinder.

2. The liquid-sealed vibration-proof device as set forth in claim 1, wherein the orifice member is a mold formed product of aluminum.

3. The liquid-sealed vibration-proof device as set forth in claim 2, wherein the partition plate member is shaped by press forming of a plate member and comprises the support cylinder supporting the second diaphragm at the whole inner periphery thereof, a clamping portion pinching and pressing the bottom wall of the recessed groove of the second diaphragm, a forcing portion forcing the orifice member upwardly, and an outer peripheral locking portion crimped and fixed to an attachment fitting, all linked together in this order from inboard to outboard.

4. The liquid-sealed vibration-proof device as set forth in claim 1, wherein the orifice member is a molded product of a synthetic plastic.

5. The liquid-sealed vibration-proof device as set forth in claim 4, wherein the partition plate member is shaped by press forming of a plate member and comprises the support cylinder supporting the second diaphragm at whole inner periphery thereof, a clamping portion pinching and pressing the bottom wall of the recessed groove of the second diaphragm, a forcing portion forcing the orifice member upwardly, and an outer peripheral locking portion crimped and fixed to an attachment fitting, all linked together in this order from inboard to outboard.

6. The liquid-sealed vibration-proof device as set forth in claim 1, wherein the recessed groove of the second diaphragm is press-fitted in the hook portion.

7. The liquid-sealed vibration-proof device as set forth in claim 6, wherein the partition plate member is shaped by press forming of a plate member and comprises the support cylinder supporting the second diaphragm at the whole inner periphery thereof, a clamping portion pinching and pressing the bottom wall of the recessed groove of the second diaphragm, a forcing portion forcing the orifice member upwardly, and an outer peripheral locking portion crimped and fixed to an attachment fitting, all linked together in this order from inboard to outboard.

8. The liquid-sealed vibration-proof device as set forth in claim 1, wherein:

the recessed groove of the second diaphragm at the marginal part is defined by an inside wall linking with a perimeter of a rubber-like elastomer membrane, an outside wall surrounding the inside wall and a bottom wall linking between the inside walls, thus assuming an upside-open U-shape in cross-section; and the hook portion of the orfice member is press-fitted in recessed groove.

9. The liquid-sealed vibration-proof device as set forth in claim 8, wherein the partition plate member is shaped by press forming of a plate member and comprises the support cylinder supporting the second diaphragm at the whole inner periphery thereof, a clamping portion pinching and pressing the bottom wall of the recessed groove of the second diaphragm, a forcing portion forcing the orifice member upwardly, and an outer peripheral locking portion crimped and fixed to an attachment fitting, all linked together in this order from inboard to outboard.

10. The liquid-sealed vibration-proof device as set forth in claim 1, wherein the partition plate member is shaped by press forming of a plate member and comprises the support cylinder supporting the second diaphragm at the whole inner periphery thereof, a clamping portion pinching and pressing the bottom wall of the recessed groove of the second diaphragm, a forcing portion forcing the orifice member upwardly, and an outer peripheral locking portion crimped and fixed to an attachment fitting, all linked together in this order from inboard to outboard.

* * * * *